(12) United States Patent
Jakkula (10) Patent No.: US 12,536,122 B2
(45) Date of Patent: Jan. 27, 2026

(54) SECURING NETWORK ACCESS USING DYNAMICALLY GENERATED BAUD-RATES

(71) Applicant: Carrier Corporation, Palm Beach Gardens, FL (US)

(72) Inventor: Ravisankar Jakkula, Telangana (IN)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 64 days.

(21) Appl. No.: 18/315,120

(22) Filed: May 10, 2023

(65) Prior Publication Data

US 2023/0367734 A1 Nov. 16, 2023

Related U.S. Application Data

(60) Provisional application No. 63/340,711, filed on May 11, 2022.

(51) Int. Cl.
*G06F 13/42* (2006.01)
*G06F 21/55* (2013.01)
*H04L 12/40* (2006.01)

(52) U.S. Cl.
CPC ............ *G06F 13/42* (2013.01); *G06F 21/554* (2013.01); *H04L 12/4013* (2013.01); *G06F 2221/034* (2013.01)

(58) Field of Classification Search
CPC .................. G06F 13/42; G06F 21/554; G06F 2221/034; H04L 12/4013
See application file for complete search history.

(56) References Cited

U.S. PATENT DOCUMENTS

| | | | |
|---|---|---|---|
| 6,163,586 A * | 12/2000 | Hongbin Hao | H04L 25/0262 710/60 |
| 7,209,561 B1 | 4/2007 | Shankar et al. | |
| 8,356,201 B2 | 1/2013 | Newald | |
| 8,542,069 B2 | 9/2013 | Kelling et al. | |
| 10,037,441 B2 | 7/2018 | Kaluzhny et al. | |
| 10,291,403 B2 | 5/2019 | Ligatti et al. | |
| 10,541,833 B2 | 1/2020 | Andrews | |
| 10,970,382 B2 | 4/2021 | Hofman | |
| 2003/0053245 A1* | 3/2003 | Ozdemir | G11B 19/28 360/48 |
| 2007/0291887 A1* | 12/2007 | Ishimoto | H04L 25/40 375/371 |

(Continued)

FOREIGN PATENT DOCUMENTS

| | | |
|---|---|---|
| CN | 106920357 A | 7/2017 |
| WO | 2020208639 A2 | 10/2020 |

*Primary Examiner* — Henry Tsai
*Assistant Examiner* — Harry Z Wang
(74) *Attorney, Agent, or Firm* — CANTOR COLBURN LLP (57) ABSTRACT

A communications network includes a bus communicatively coupled to a first device and a second device. The first device and the second device are operable to perform multiple iterations of a baud-rate change (BRC) process. Each of the multiple iterations of the BRC process includes synchronizing the first device and the second device to identify when a baud-rate switch operation will be applied; and applying the baud-rate switch operation to change a currently-used baud-rate of communications between the first device and the second device to a new baud-rate of communications between the first device and the second device.

20 Claims, 8 Drawing Sheets

(56) References Cited

U.S. PATENT DOCUMENTS

| | | | |
|---|---|---|---|
| 2009/0245516 A1 | 10/2009 | Ravikiran | |
| 2014/0270033 A1* | 9/2014 | Richards | H03L 7/06 |
| | | | 375/376 |
| 2015/0033016 A1 | 1/2015 | Thornton et al. | |
| 2016/0330044 A1* | 11/2016 | Andrews | H04L 5/0055 |
| 2018/0337934 A1* | 11/2018 | Huth | H04L 63/1425 |
| 2018/0337938 A1 | 11/2018 | Kneib et al. | |
| 2019/0253439 A1 | 8/2019 | Payton | |
| 2021/0001793 A1* | 1/2021 | Ujiie | H04L 12/40084 |
| 2021/0203682 A1 | 7/2021 | Bajpai | |

\* cited by examiner

SECURING NETWORK ACCESS USING DYNAMICALLY GENERATED BAUD-RATES

CROSS-REFERENCE TO RELATED APPLICATIONS

This application claims the benefit of U.S. Provisional Application No. 63/340,711 filed May 11, 2022, the disclosure of which is incorporated herein by reference in its entirety.

BACKGROUND

Exemplary embodiments of the present disclosure relate in general to communications networks, and more particularly to systems and methods operable to secure network access using dynamically generated baud-rates.

Data communication networks transmit digital data from one computer to another computer using a variety of communication channels and protocols. The physical connections between networked computing devices are established using cable media and/or wireless media. The best-known data communication network is actually a network of networks called an internetwork, or simply the Internet. The Internet is the world's largest network and uses a transmission control protocol/internet protocol (TCP/IP) as its protocol suite, along with using IP as its addressing protocol.

A variety of data communication networks have been developed for different applications. For example, the controller area networking (CAN) network (or CAN bus) was defined initially for use in automotive applications (CAN 2.0) and has been extended to other types of distributed industrial systems. CAN is unusual in that the entities on the network, called nodes, are not given specific addresses. Instead, it is the messages themselves that have an identifier, which also determines the messages' priority. Depending on their function, nodes transmit specific messages and look for specific messages. The CAN bus is a multi-master differential communication system in which messages are multicast, which means every microcontroller and component connected to the CAN bus receives each message. This design allows for multiple systems designed by multiple companies to be integrated together. The CAN bus architecture is robust from the standpoint that if one node fails all others nodes are still operational.

Although, the single bus consolidation approach used in CAN architectures can provide flexibility and robustness, there are vulnerabilities in the area of network access security. The single bus consolidation approach allows an attacker (e.g., a malicious node) access to all of the CAN's critical functions once access to the bus is obtained, which makes CAN bus architectures vulnerable to malicious or passive cyber-attacks. Because a message sent to the CAN bus has no specific destination, every access point or controller on the bus has access to all messages, which means passive attackers could listen in on the bus communications with ease by simply inserting a malicious node onto the CAN bus.

Accordingly, there is a need to effectively and efficiently address network access security as upfront requirements when developing a data communication network (e.g., a CAN bus network) for a particular application.

BRIEF DESCRIPTION

According to an embodiment, a communications network includes a bus communicatively coupled to a first device and a second device. The first device and the second device are operable to perform multiple iterations of a baud-rate change (BRC) process. Each of the multiple iterations of the BRC process includes synchronizing the first device and the second device to identify when a baud-rate switch operation will be applied; and applying the baud-rate switch operation to change a currently-used baud-rate of communications between the first device and the second device to a new baud-rate of communications between the first device and the second device.

In addition to one or more of the features described above, or as an alternative to any of the foregoing embodiments, the communications network includes the first device operable to detect error messages on the bus generated by a third device communicatively coupled to the bus.

In addition to one or more of the features described above, or as an alternative to any of the foregoing embodiments, the communications network includes the third device not operable to perform the BRC process.

In addition to one or more of the features described above, or as an alternative to any of the foregoing embodiments, the communications network includes the first device operable to, responsive to detecting error messages on the bus generated by the third device, initiate counter-cyber-attack actions.

In addition to one or more of the features described above, or as an alternative to any of the foregoing embodiments, the communications network includes the counter-cyber-attached actions selected from the group consisting of pausing the bus; shutting the bus down; logging a cyber-attack event; providing a notification of a potential malicious presence on the bus; and requesting technical assistance.

In addition to one or more of the features described above, or as an alternative to any of the foregoing embodiments, the communications network includes each of the multiple iterations of the BRC process spaced apart from one another by a first time window.

In addition to one or more of the features described above, or as an alternative to any of the foregoing embodiments, the communications network includes the first time window less than a second time window; and the second time window defines a minimum time required by a third device communicatively coupled to the bus to determine the new baud-rate of communications between the first device and the second device without using the BRC process.

In addition to one or more of the features described above, or as an alternative to any of the foregoing embodiments, the communications network includes synchronizing the first device and the second device such that the first device broadcasts a baud-rate switch time over the bus; the baud-rate switch time includes a time at which the baud-rate switch operation will be applied; the baud-rate switch operation includes computing the new baud-rate from a data block transmitted over the bus; and the data block is also used to perform bit timing operations.

In addition to one or more of the features described above, or as an alternative to any of the foregoing embodiments, the communications network includes a controller area networking (CAN) network, and the data block includes a SYNC_SEG data segment; a PROP_SEG data segment; a PHASE_SEG1 data segment; and a PHASE_SEG2 data segment. Additionally, the new baud-rate is not one of a set of standard CAN network baud-rates.

In addition to one or more of the features described above, or as an alternative to any of the foregoing embodiments, the communications network includes synchronizing the first device and the second device by using the first device to broadcast a start message over the bus. The baud-rate switch operation is responsive to the start message; and the baud-rate switch operation includes selecting the new baud-rate of communications between the first device and the second device from stored baud-rate options.

According to another embodiment, a method of operating a communications network includes using a first device and a second device communicatively coupled to one another through a bus to perform multiple iterations of a baud-rate change (BRC) process. Each of the multiple iterations of the BRC process includes synchronizing the first device and the second device to identify when a baud-rate switch operation will be applied; and applying the baud-rate switch operation to change a currently-used baud-rate of communications between the first device and the second device to a new baud-rate of communications between the first device and the second device.

In addition to one or more of the features described above, or as an alternative to any of the foregoing embodiments, the method of operating the communications network includes using the first device to detect error messages on the bus generated by a third device communicatively coupled to the bus.

In addition to one or more of the features described above, or as an alternative to any of the foregoing embodiments, the method of operating the communications network includes the third device not operable to perform the BRC process.

In addition to one or more of the features described above, or as an alternative to any of the foregoing embodiments, the method of operating the communications network includes using the first device to, responsive to detecting error messages on the bus generated by the third device, initiate counter-cyber-attack actions.

In addition to one or more of the features described above, or as an alternative to any of the foregoing embodiments, the method of operating the communications network includes the counter-cyber-attached actions being selected from the group consisting of pausing the bus; shutting the bus down; logging a cyber-attack event; providing a notification of a potential malicious presence on the bus; and requesting technical assistance.

In addition to one or more of the features described above, or as an alternative to any of the foregoing embodiments, the method of operating the communications network includes each of the multiple iterations of the BRC process spaced apart from one another by a first time window.

In addition to one or more of the features described above, or as an alternative to any of the foregoing embodiments, the method of operating the communications network includes the first time window being less than a second time window; and the second time window defining a minimum time required by a third device communicatively coupled to the bus to determine the new baud-rate of communications between the first device and the second device without using the BRC process.

In addition to one or more of the features described above, or as an alternative to any of the foregoing embodiments, the method of operating the communications network includes synchronizing the first device and the second device such that the first device broadcasts a baud-rate switch time over the bus; the baud-rate switch time includes a time at which the baud-rate switch operation will be applied; the baud-rate switch operation includes computing the new baud-rate from a data block transmitted over the bus; and the data block is also used to perform bit timing operations.

In addition to one or more of the features described above, or as an alternative to any of the foregoing embodiments, the method of operating the communications network includes implementing the communications network as a controller area networking (CAN) network, wherein the data block includes a SYNC_SEG data segment; a PROP_SEG data segment; a PHASE_SEG1 data segment; and a PHASE_SEG2 data segment. Additionally, the new baud-rate is not one of a set of standard CAN network baud-rates.

In addition to one or more of the features described above, or as an alternative to any of the foregoing embodiments, the method of operating the communications network includes synchronizing the first device and the second device by using the first device to broadcast a start message over the bus. The baud-rate switch operation is responsive to the start message; and the baud-rate switch operation includes selecting the new baud-rate of communications between the first device and the second device from stored baud-rate options.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed systems and methods are presented herein by way of exemplification and not limitation with reference to the Figures.

Embodiments of the present disclosure provide methods and systems that effectively and efficiently provide network access security and/or message authentication in a data communication network such as a CAN bus network. In embodiments of the disclosure, network access security is provided by implementing a dynamic baud-rate cyber-attack prevention/detection process (or dynamic baud-rate change process) for entities that attempt to place communications on or retrieve communications from the CAN bus. In known CAN bus architectures, the baud-rate is the rate (speed) at which data is transmitted on the network. The baud-rate is typically expressed in kilobits-per-second (kbps). In known CAN bus architectures, the baud-rate is fixed when the relevant CAN bus application is built. In embodiments of the disclosure, the dynamic baud-rate change process is operable to run the CAN bus using different baud-rates in different time slots without affecting CAN communications by time-synchronizing the CAN host and legitimate CAN devices such that the host and the legitimate CAN devices change from a currently-used baud-rate to a new baud-rate at substantially the same time.

Because a malicious device on the CAN is not aware of the dynamic baud-rate change process, the malicious device is not equipped to time synchronize with the CAN host and identify the correct baud-rate for communicating over the CAN bus. In some embodiments, the currently-used baud-rate is changed at a frequency that does not provide a malicious device with sufficient time to hack or figure out the currently-used baud-rate. As a result, a malicious device attempting to communicate over the CAN bus without knowledge of the baud-rate change process will repeatedly use the wrong baud-rate (i.e., a baud-rate that is not currently being used on the CAN bus), which generates repeated communication errors. The repeated communication errors generated by the malicious device attempting to communicate over the CAN bus at an invalid baud-rate can be detected by the CAN host and used to initiate counter-cyber-attack actions such as pausing the CAN bus, shutting the CAN bus down, logging the cyber-attack event, providing a notification of the potential malicious presence, and/or requesting technical assistance.

Some malicious devices may include hacking software that attempts to analyze bus traffic in a manner that might possibly, if given enough time, allow the malicious device to determine the baud-rate that is currently being used on the CAN bus. To combat such hacking software, embodiments of the disclosure change to a new baud-rate at a change-rate that ensures that a malicious device with hacking software has insufficient time to figure out the currently-used baud-rate before the baud-rate is changed. In some embodiments, hacking is further combated by making the change-rate dynamic.

In some embodiments, the disclosed dynamic baud-rate change process is implemented by using the CAN host to dictate the baud-rate to legitimate CAN devices as a broadcast message in random time slots, which is described in greater detail subsequently herein. In some embodiments, the disclosed dynamic baud-rate change process is implemented using a dynamic baud-rate determination algorithm, which is also described in greater detail subsequently herein.

Figure 1:
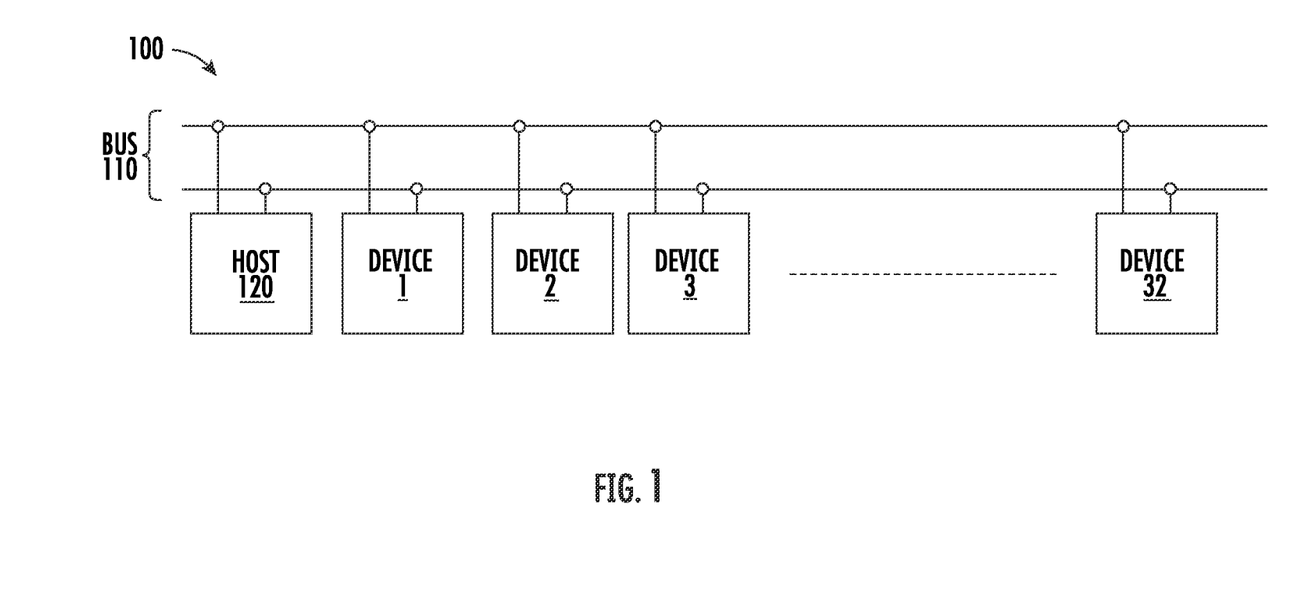
FIG. 1 is a block diagram of a CAN bus operable to implement a baud-rate change process according to an embodiment.
Figure 2:
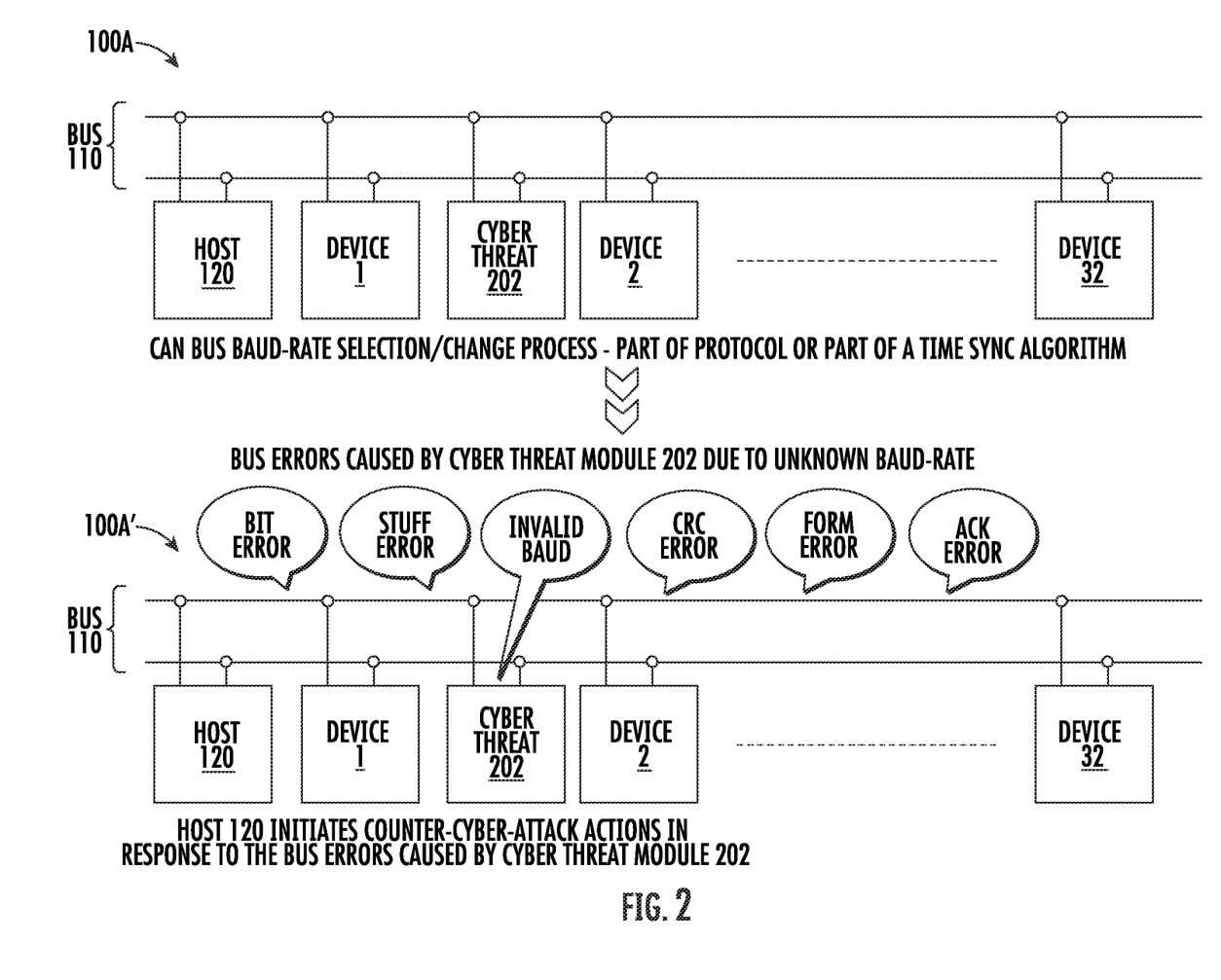
FIG. 2 is a block diagram of a CAN bus operable to implement a baud-rate change process according to an embodiment.

With reference now to FIG. 1, embodiments of the disclosure can be applied to a variety of communications networks, including but not limited to a CAN bus system 100. In accordance with embodiments of the disclosure, the CAN bus system 100 is operable to implement a dynamic baud-rate cyber-attack prevention/detection process (or dynamic baud-rate change process) according to embodiments. The CAN bus system 100 is depicted in FIG. 1 as a simplified diagram illustrating a host node/device 120 and multiple connected devices 1-32 in communication over a bus 110. The CAN bus system 100 is a peer-to-peer network, which means there is no master that controls when CAN devices (host 120 and devices 1-32) have access to read and write data on the bus 110. When a CAN device is ready to transmit data, it checks to see if the bus 110 is busy then simply writes a CAN frame (not shown) onto the bus 110, The CAN frames that are transmitted do not contain addresses of either the transmitting device or any of the intended receiving devices(s). Instead, an arbitration. ID that is unique throughout the CAN bus system 100 labels the frame. AU CAN devices (host 120 and devices 1-32) on the CAN bus system 100 receive the CAN frame, and, depending on the arbitration ID of that transmitted frame, each CAN device on the CAN bus system 100 decides whether to accept the frame. If multiple CAN devices (host 120 and device 1-32) attempt to transmit a message onto the bus 110 at the same time, the device with the highest priority (lowest arbitration ID) automatically receives access to the bus 110. Lower-priority devices must wait until the bus 110 becomes available before trying to transmit again. In this way, the CAN bus system 100 ensures deterministic communication among CAN devices (host 120 and devices 1-32), FIG. 2 is a block diagram illustrating a CAN bus system 100A. CAN bus system 100A is identical to CAN bus system 100 (shown in FIG. 1) except a cyber-threat module 202 has accessed the bus 110 of the CAN bus system 110A. FIG. 2 also depicts a CAN bus system 100A', which is identical to the CAN bus system 100A except the cyber-threat module 202 has attempted to access data on the bus 110 without knowing the currently-used baud-rate, which is being set by a dynamic baud-rate change process executed by the CAN bus system 100A, 100A'. In known CAN bus systems, the baud-rate is fixed when the relevant CAN bus application is built. In embodiments of the disclosure, the dynamic baud-rate change process is operable to run the CAN bus 110 using different baud-rates in different time slots without affecting CAN communications by time-synchronizing the CAN host 120 and legitimate CAN devices 1-32 such that the host 120 and the legitimate CAN devices 1-32 change from a currently-used baud-rate to a new baud-rate such that the host 120 and the legitimate CAN devices 1-32 are using the new baud-rate during a given communications window.

As shown by CAN bus system 100A', because the cyber-threat module 202 does not know the dynamic baud-rate change process, and because the currently-used baud-rate is changed at a frequency that does not provide the cyber-threat module 202 with sufficient time to hack or figure out the currently-used baud-rate, when the cyber-threat module 202 attempts to communicate through the bus 110 it will do so at an invalid baud-rate, which results in one or more error messages (e.g., bit error, stuff error, critical redundancy check (CRC) error, form error, acknowledgement (ACK) error, and the like) that will be detected by the host 120. The host 120 uses the error generating behavior by the cyber-threat device 202 to initiate counter-cyber-attack actions such as pausing the CAN bus system 100A', shutting down the CAN bus system 100A', logging the cyber-attack event, providing a notification of the potential malicious presence, and/or requesting technical assistance.

The cyber-threat module 202 can include hacking software that attempts to analyze traffic on the CAN bus 110 in a manner that might possibly, if given enough time, allow the cyber-threat module 202 to determine the baud-rate that is currently being used on the CAN bus 110. To combat such hacking software, embodiments of the disclosure change to a new baud-rate at a change-rate that ensures that any hacking software included in the cyber-threat module 202 has insufficient time to figure out the currently-used baud-rate before the baud-rate is changed. In some embodiments, the change-rate is itself dynamic.

Figure 3:
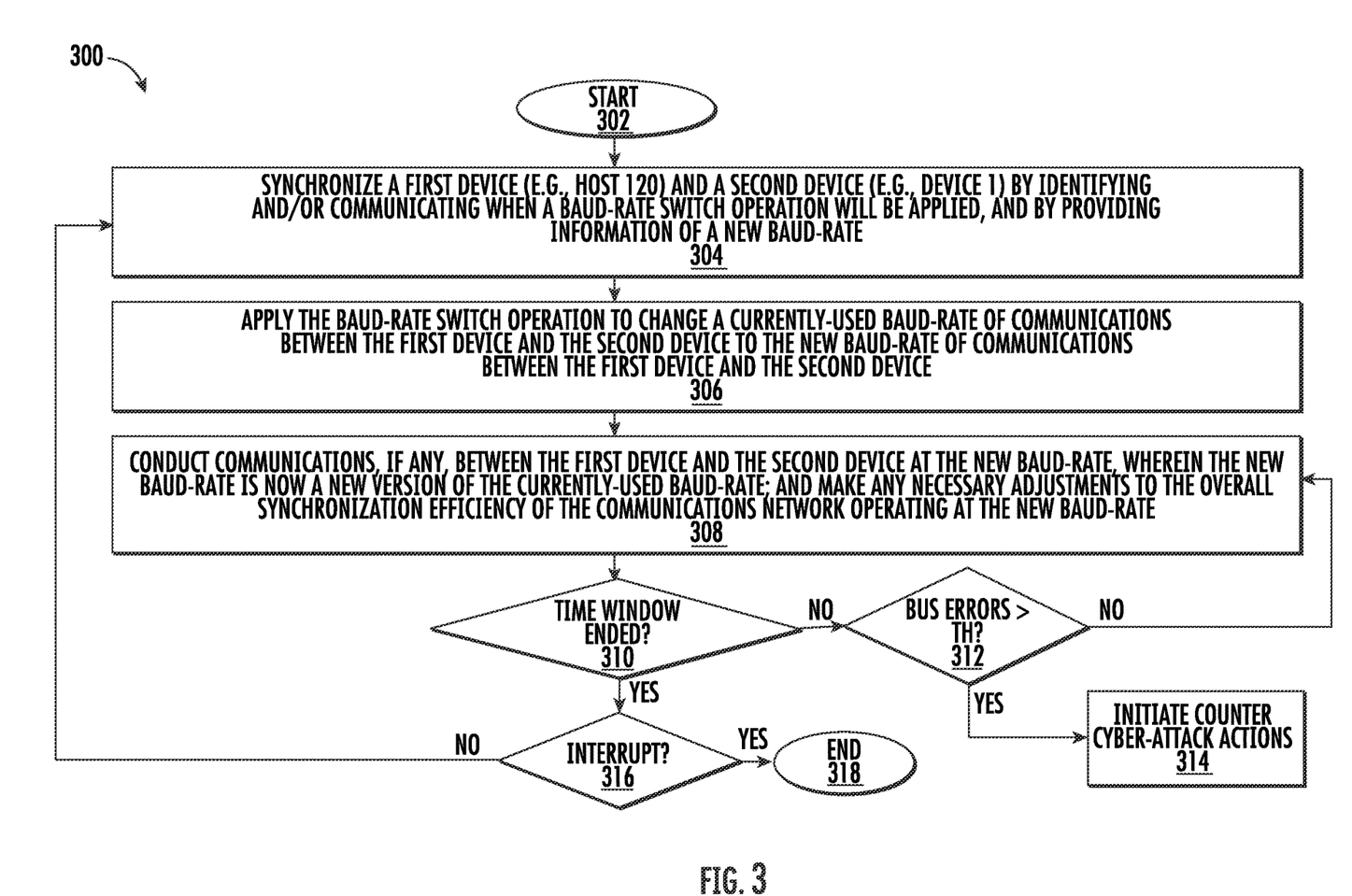
FIG. 3 is a flow diagram illustrating aspects of a band-rate change process according to an embodiment.

FIG. 3 is a flow diagram illustrating a methodology 300 in accordance with embodiments. The methodology 300 is implemented by a communications network, such as the CAN bus system 100A, 100A', to perform a dynamic baud-rate change process in accordance with embodiments of the disclosure. For ease of explanation, the methodology 300 is described with reference to communications between a first device (e.g., the host 120) and a second device (e.g., device 1). However, the methodology 200 is applicable to communications between and among any of the devices on the CAN bus 110. The methodology 300 begins at block 302 then moves to block 304 where a first device (e.g., the host 120) and a second device (e.g., Device 1) are synchronized by, in effect, notifying the first device and the second device of when the communications protocol of the communications network will switch from a currently-used baud-rate to a new baud-rate, which notifies the first device and the second device of when to apply a baud-rate switch operation. In embodiments of the disclosure, block 304 also provides the first device and the second device with information relevant to what the new baud-rate will be. In embodiments, the new baud-rate will be a random number that is not one of the standard CAN bus baud-rates. The communications protocols of known communications networks such as the CAN bus, operating without benefit of the present disclosure, set the baud-rate at one of several standard baud-rates. For a CAN bus, the standard baud-rates are 125 Kbit/s, 250 Kbit/s, 500 Kbit/s and 1 Mbit/s. Devices that are designed to connect with a CAN bus can be preprogrammed to cycle through the CAN bus standard baud-rates when attempting to communicate over a CAN bus. However, in embodiments of the present disclosure, the communications network protocol is operable to not use standard baud-rates and instead use random numbers that do not overlap with one of the standard baud-rates of the communications network.

At block 306, the methodology 300 uses the synchronization information provided at block 304 (i.e., when the baud-rate will change; and information of what the new baud-rate will be) to apply a baud-rate switch operation that uses the information of what the new baud-rate will be, along with the information identifying when the new-baud rate will be used, to switch communications between the first device and the second from using the currently-used baud-rate to using a new baud-rate. Non-limiting examples of how blocks 304 and 306 can be implemented are depicted in FIGS. 4A-6 and are described in greater detail subsequently in this detailed description. At block 308, communications, if any, between the first device and the second device are conducted at the new baud-rate (determined at node 306), wherein the new baud-rate is now a new version of the currently-sued baud-rate. In embodiments, block 308 also makes any necessary adjustments to the overall synchronization efficiency of the communications network operating at the new frequency. Additional details of how overall synchronization efficiency of the communications network is managed are discussed in connection with the subsequent description of the network bit timing principles depicted in FIGS. 4A and 4B.

From block 308, the methodology 300 moves to decision block 310 to determine whether or not a time window (or time limit) for using the new baud-rate has ended. In embodiments, the time window can be set such that it is less than an expected minimum duration of time that would be required for the cyber threat module 202 to use hacking software to determine the new baud-rate without using the methodology 300. In some embodiments, the time window at decision block 310 can be dynamically changed for different iterations of the methodology 300. If the answer to the inquiry at decision block 310 is no, the methodology 300 moves to decision block 312 to determine whether or not there is an unusual level of errors on the network bus. In other words, the inquiry at decision block 312 determines whether the bus errors exceed a threshold (Th) for potentially malicious activity on the bus, which is attributed to a malicious device (e.g., cyber threat module 202) generating a large number of error messages because it is attempting to communicate over the network bus without being operable to participate in the operations depicted at blocks 304, 306. If the answer to tine inquiry at decision block 312 is yes, the methodology 300 moves to block 314 and initiates counter cyber-attack actions. If the answer to the inquiry at decision block 312 is no, the methodology 300 returns to block 308 and continues conducting communications using the new baud-rate.

If the answer to the inquiry at decision block 310 is yes, the methodology 300 moves to decision block 316 to determine whether any kind of interrupt request has been received. If the answer to the inquiry at decision block 316 is yes, the methodology 300 moves to block 318 and ends. If the answer to the inquiry at decision block 316 is no, the methodology 300 returns to block 304 to perform another iteration of the methodology 300 to again change the baud-rate for legitimate devices (e.g., host 120 and devices 1-32) on the communications network.

Figure 4A:
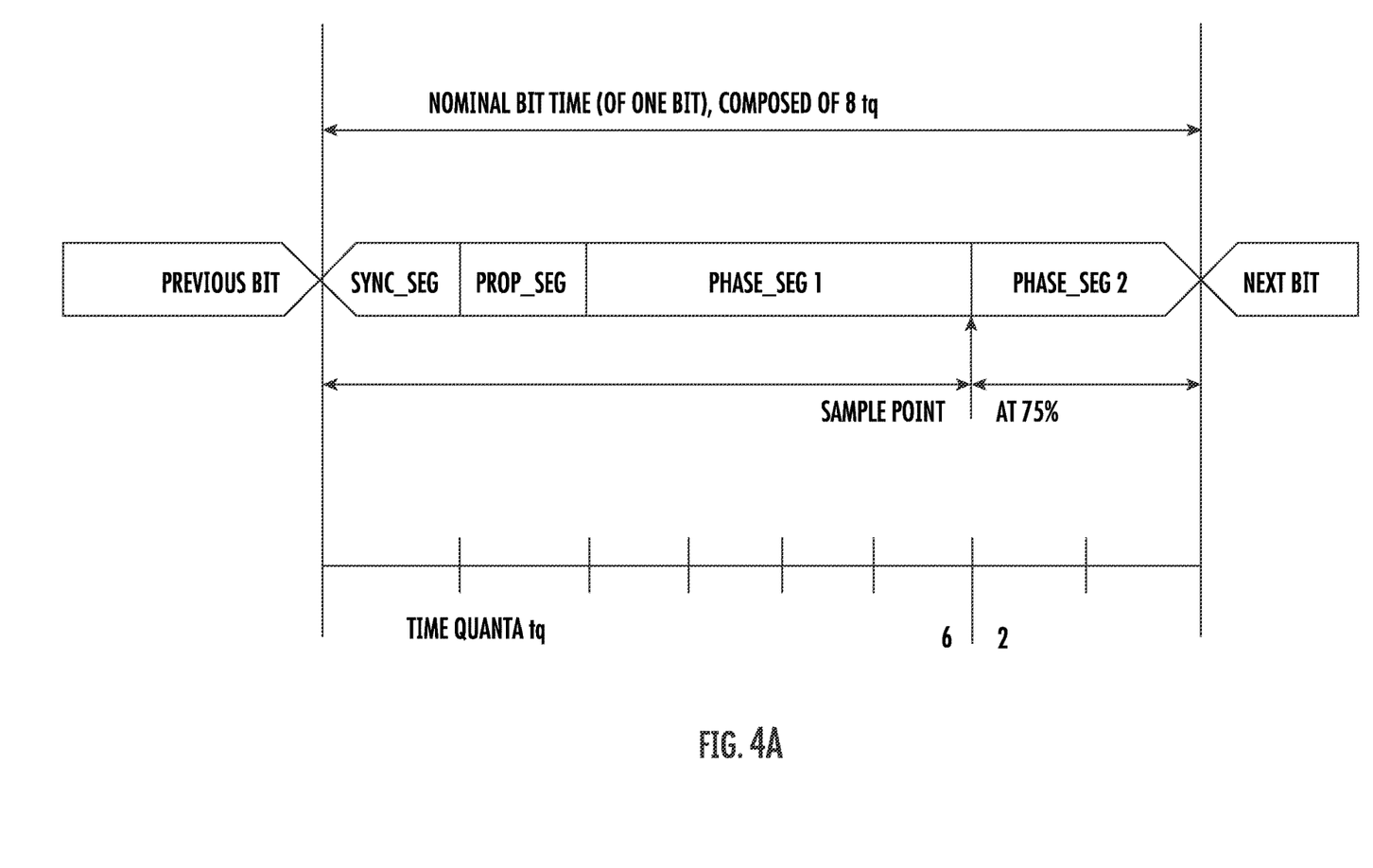
FIG. 4A is a diagram illustrating aspects of a baud-rate change process according to an embodiment.
Figure 4B:
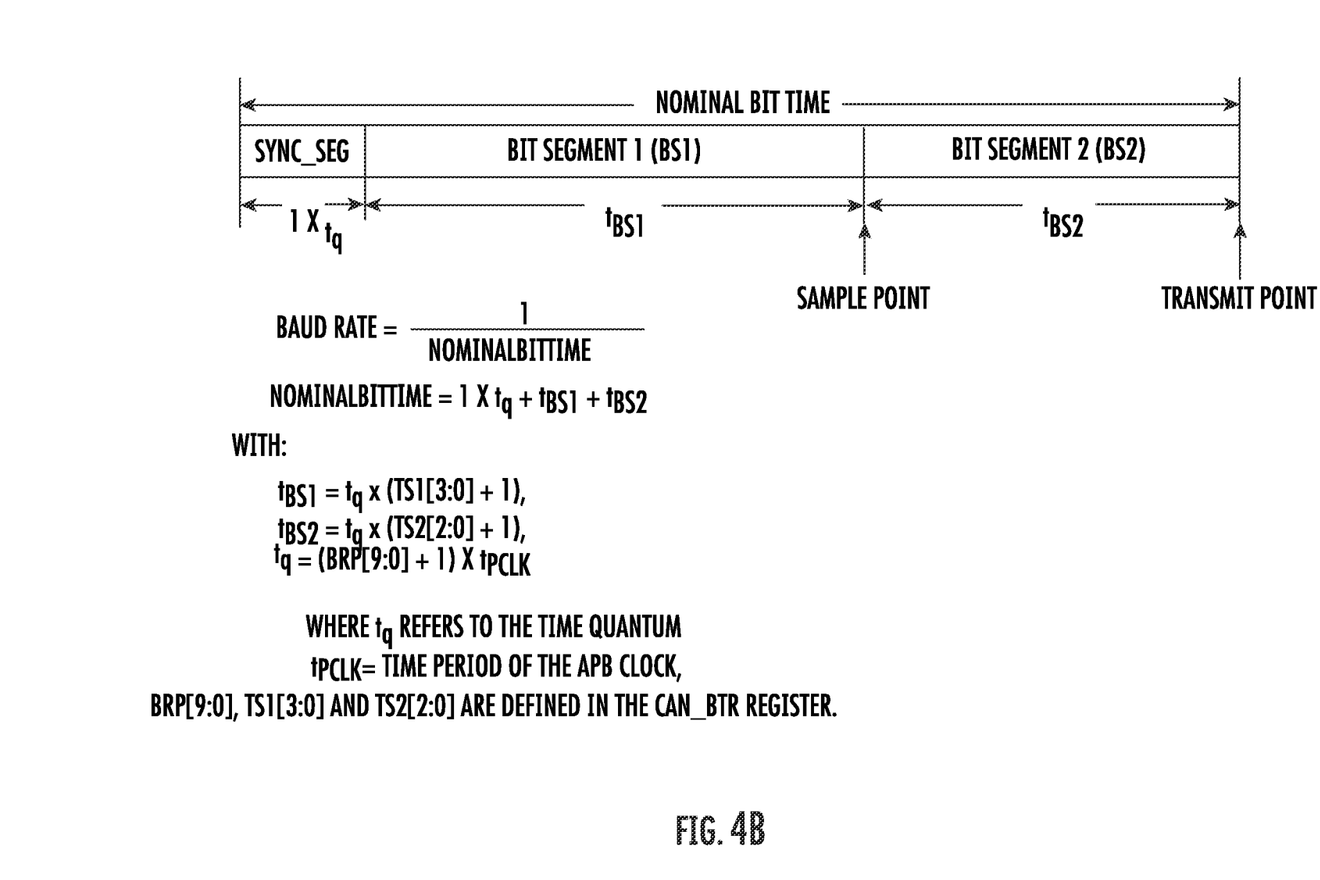
FIG. 4B is a diagram illustrating aspects of a baud-rate change process according to an embodiment.
Figure 5:
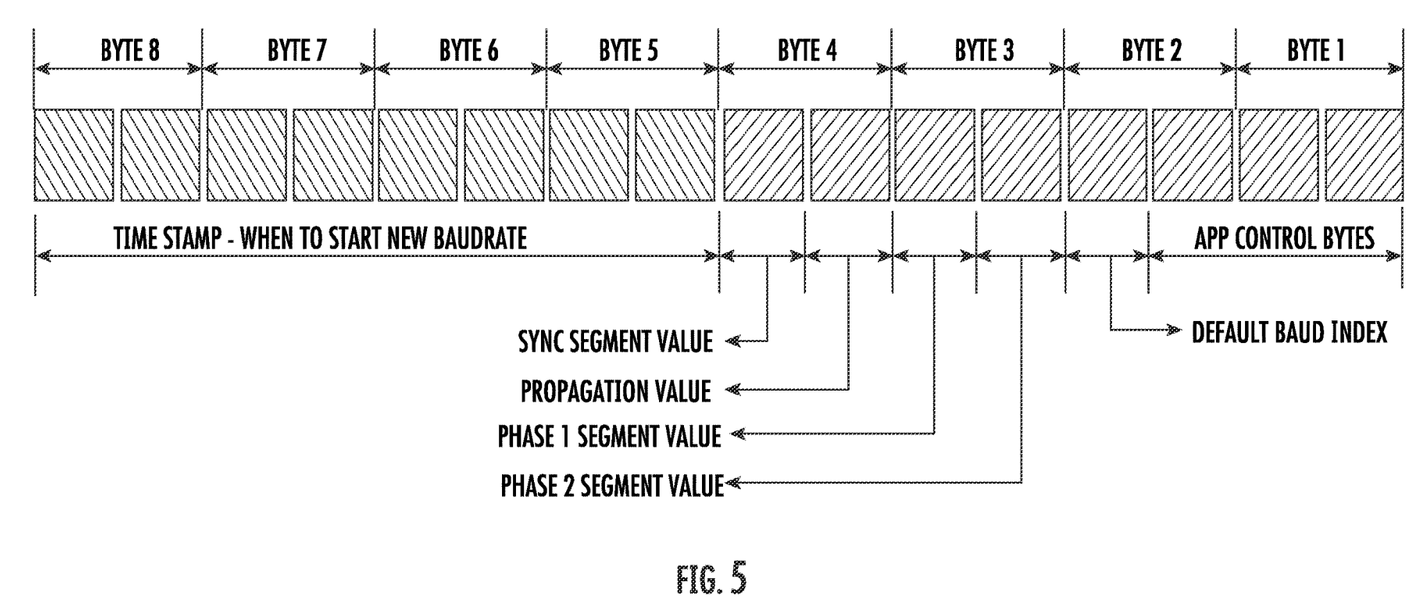
FIG. 5 is a diagram illustrating aspects of a baud-rate change process according to an embodiment.

The dynamic baud-rate change process of the methodology 300 can be executed as part of the protocol of the CAN bus system 100A, 100A'. In some embodiments, the disclosed dynamic baud-rate change process is implemented by using the CAN host 120 to dictate the baud-rate to legitimate devices 1-32 as a broadcast message in random time slots, which is illustrated in FIGS. 4A, 4B, and 5 and described in greater detail subsequently herein. In some embodiments, the disclosed dynamic baud-rate change process of the methodology 300 can be implemented using a dynamic baud-rate determination algorithm, which is illustrated by a methodology 500 show in FIG. 6 and described in greater detail subsequently herein. The time synchronization algorithm depicted in FIG. 6 can be executed by the host 120 and the devices 1-32.

Prior to describing example details of the dynamic baud-rate change processes depicted in FIGS. 5 and 6, FIGS. 4A and 4B depict diagrams illustrating how bit time of the CAN bus 100A, 100A' can be set in accordance with embodiments. Embodiments of the disclosure leverage bit timing features of a network communication system as shown in FIG. 4A to dynamically change the baud-rate between the legitimate (i.e., non-malicious) nodes on the communications network. As with other network protocols, the CAN network protocol is a set of established rules that dictate how to format, transmit and receive data so that computer network devices—from servers and routers to endpoints—can communicate, regardless of the differences in their underlying infrastructures, designs or standards. To successfully send and receive information, devices on both sides of a communication exchange must accept and follow protocol conventions. Network protocols such as CAN protocols can be built into software, hardware or both.

The CAN protocol is an asynchronous serial bus with non-return to zero (NRZ) bit coding designed for fast, robust communications in harsh environments, such as automotive and industrial applications. The CAN protocol allows the user to program the bit rate, the sample point of the bit, and the number of times the bit is sampled. With these features, the network can be optimized to provide a synchronization efficiency (e.g., 75% as shown in FIG. 4A, or up to 90%) that matches the requirements for a given application. The CAN protocol's NRZ bit coding provides a maximum of data transport capacity but in turn lacks sufficient means of bit synchronization between sender and receivers in a CAN network. Bit stuffing, i.e., the insertion of an additional bit of reversed polarity after a series of bits of the same polarity, provides a higher number of signal edges for synchronization, but, with maximum reliability requirements in mind, bit stuffing alone is not sufficient. In order to assure that all receivers in a CAN network read the transmitted frames correctly they are also required to continuously resynchronize the internal time base with the received bit stream. This is accomplished by continuously adjusting the bit sample point during each bit time. The purpose of bit timing synchronization is to coordinate the oscillator frequencies in a CAN network and as a result provide a system wide specified time reference.

In the disclosed embodiments, the communications network is the CAN bus 100A, 100A' operable to implement a CAN protocol that has been modified to include and/or utilize the disclosed dynamic baud-rate change process. A dynamic baud-rate change process in accordance with embodiments of the disclosure leverages a relationship between the nominal bit time, the width of the various data segments that make up the nominal bit time, and the baud-rate (as shown by the formulas depicted in FIG. 4B) to dynamically control or change the network's baud-rate by providing information (e.g., the width of the various data segments that make up the nominal bit time) that can be utilized to determine a new baud-rate, and by time synchronizing the legitimate network nodes such that they all switch to the new baud-rate at the right time to enable subsequent communications at the new baud-rate.

As shown in FIG. 4A, a receiving CAN node reads the bit information at a bit sample point that is located somewhat close to the end of the actual bit time in order to compensate for signal propagation delays in the CAN network plus delays within the actual CAN receiver/transmitter circuits. Because the CAN protocol manages the bus access through bit-wise arbitration, it must be assured that the signal propagation time from sender to receiver and back to the sender must be completed within one bit time. CAN nodes (host 120 and devices 1-32) transmitting a message to the bus 110 also monitor the bus 110 and compare the transmitted level bit by bit with the corresponding level on the bus 110. Consequently, considering the signal propagation time from sender to receiver and back to the sender is mandatory for bit monitoring. The determination of the bit sample point, and consequently its positioning, requires an internal detection and simulation of the actual bit time reference.

Referring still to FIG. 4A, in order to determine the exact bit sample point, the CAN protocol partitions the nominal bit time into four non-overlapping time segments. the CAN bit period can be subdivided into four time-segments. Each time segment includes several time quanta (tq). The tq is the smallest time unit for all configuration values. As shown in FIG. 4A, SYNC_SEG is 1 tq long. It is used to synchronize the various bus devices 1-32. A signal edge is expected within this segment. Any deviations, either a premature or delayed signal edge, will be measured and the phase buffer lengths will be adjusted accordingly, which in turn moves the bit sample point (resynchronization). PROP_SEG is programmable to be 1, 2, . . . 8 tq long. It is used to compensate for signal delays across the network. PHASE_SEG1 is programmable to be 1, 2, . . . 8 tq long. It is used to compensate for edge phase errors and may be lengthened during resynchronization. PHASE_SEG2 is the maximum of PHASE_SEG1 and is the length of the information processing time. The information processing time starts with the bit sample point and is reserved for calculation of the subsequent bit level, for instance, after a bus arbitration loss. PHASE_SEG2 is also used to compensate for edge phase errors and may be shortened during resynchronization. The bit sample point is the point in time at which the bus level is read and interpreted as the value of that respective bit. Because the sample point is always at the end of Phase_Seg1, lengthening/shortening the phase buffers will move the actual sample point. The internal delay time of a CAN node is the sum of all asynchronous delays occurring during the transmission and along the reception path, which is caused by the bit timing logic units of the CAN controller.

Choosing the above-described four (4) values of the nominal bit time shown in FIG. 4B will determine the baud-rate, which will allow the CAN bus system 100A, 100A' to use any random baud-rate instead of a fixed one (e.g., 1 Mbps, 800 kbps, 750 kbps, 500 kbps, 250 kbps, 125 kbps, and so on). The CAN bit timing control registers configure the CAN bit time. By adjusting the length of the tq and the number of tqs in each segment, the nominal bit time, the sample point, and the baud-rate can be configured as desired.

FIG. 4B depicts an example set of formulas that the dynamic baud-rate change process can use to compute the new baud-rate from the configuration of the nominal bit time that has been dynamically changed in accordance with embodiments of the present disclosure. Although the example depicted in FIG. 4B uses three bit segments instead of the four bit segments shown in FIG. 4A, the baud-rate calculations shown in FIG. 4B apply equally to a nominal bit time having any number of bit segments.

FIG. 5 depicts a non-limiting example of how the disclosed dynamic baud-rate change process, and specifically the operations depicted at blocks 304, 306 of the methodology 300 shown in FIG. 3, can be implemented by using the CAN host 120 to dictate the baud-rate to legitimate devices 1-32 as a broadcast message in random time slots. As shown in FIG. 5, the host 120 can be operable to send an 8-byte baud-rate change broadcast command (bytes 8, 7, 6, 5) in random times (e.g., between 10 seconds to 30 seconds). The host 120 is further operable (e.g., using the equations shown in FIG. 4B) to construct the new baud-rate value along with when to change the baud-rate. And all devices (the host 120 and the devices 1-32) will change their bauds-rates and start communicating with one another using the new baud-rate after the defined time.

Figure 6:
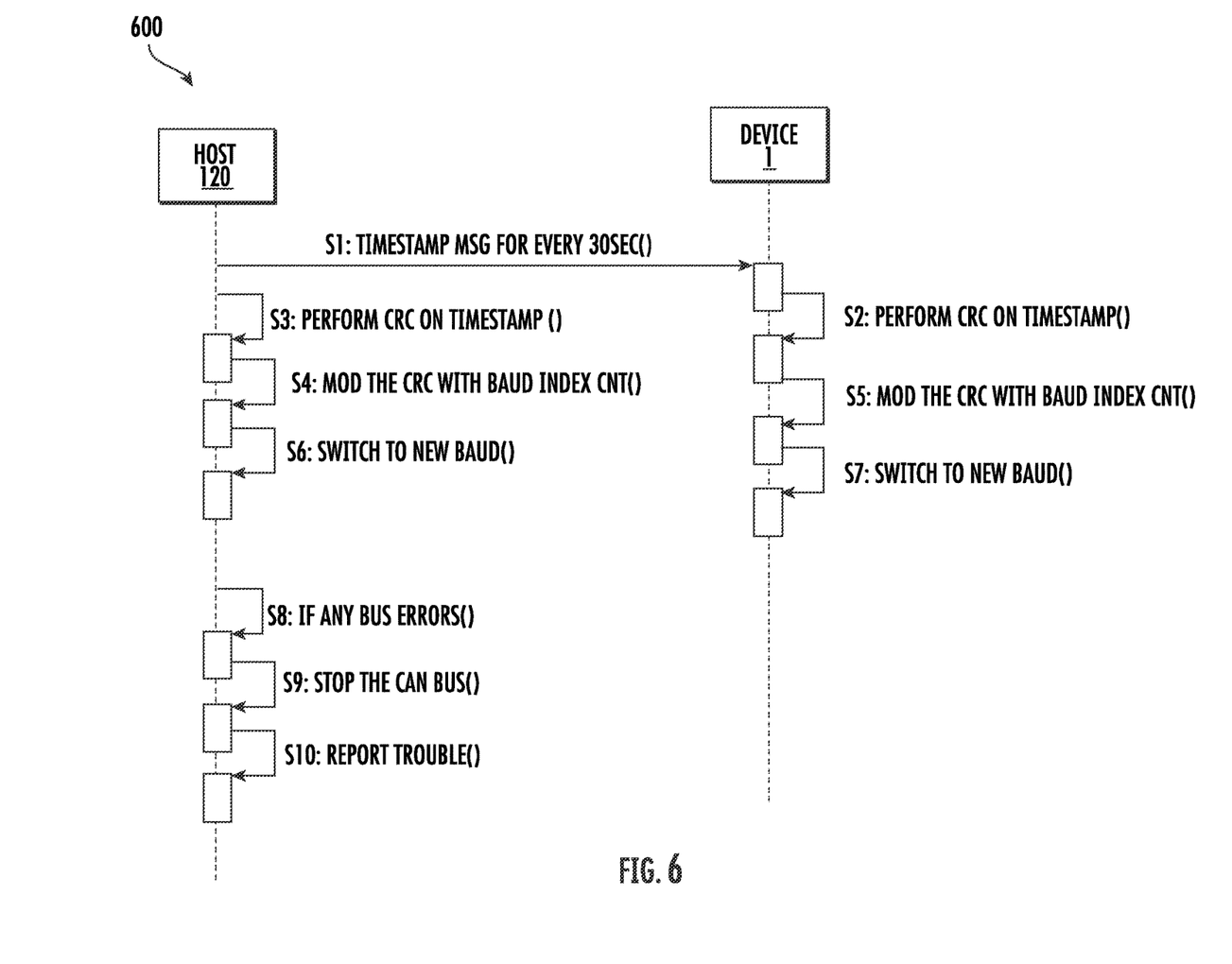
FIG. 6 is a flow diagram of a method of operating a CAN bus using a baud-rate change process according to an embodiment.

FIG. 6 depicts a non-limiting example of how the disclosed dynamic baud-rate change process, and specifically the operations depicted at blocks 304, 306 of the methodology 300 shown in FIG. 3, can be implemented by using a dynamic baud-rate determination algorithm. Unlike the non-limiting example depicted in FIG. 5, the dynamic baud-rate determination algorithm can be a look-up table having a large list (e.g., 100 or more) new-baud rate options that can be selected as the new baud-rate when the currently-used baud-rate is changed to the new baud-rate. In accordance with embodiments of the disclosure, the new baud-rate options in the look-up table are random baud-rates that do not overlap with standard baud-rates that would be used on the communications network.

In some embodiments of the disclosure, the dynamic baud-rate determination algorithm can be implemented using a methodology 600 shown in FIG. 6. Unlike the non-limiting example depicted in FIG. 5, in the methodology 600 shown in FIG. 6 there is no command from the host 120 to change the baud-rate. Instead, the host 120 and the devices 1-32 are dependent on a time stamp message that is sent by the host 120. On every time stamp the receiving device will change to new a baud-rate. All devices will perform a CRC on the time stamp with mode of number default baud-rates, and they will switch to the new baud-rate right away. In some embodiments, the new baud-rate is selected from a look-up table similar to the previously-described example.

The methodology 600 depicted in FIG. 6 proceeds as follows. The host 120 performs Steps 1, 3, 4, 6, and 8-10; and the devices 1-32 each perform Steps 2, 5, and 7, which are mirrors of Steps 3, 4, and 6 performed at the host 120. At Step 1 (S1), the host 120 generates a time stamp message for every 30 seconds and transmits it to the devices 1-32. At Step 2 (S2), the devices 1-32 perform CRC on the timestamp to generate a pseudo random number. At Step 3 (S3), the host 120 also performs CRC on the timestamp to also generate the pseudo random number. At Step 4 (S4), the host 120 takes a mod of the CRC with a baud-rate index count. The term "mod" is actually the short form of modulus. For example, the modulus 10 of a number means when you divide the number X, whatever remainder is left from the division is called the modulus 10 of the number X. As another example, mod 10 of 52 means divide 52 by 10 and take the remainder as the mod 10 of 52. The modulus points to a lookup table location that provides a value for the new baud-rate. At Step 5 (S5), each of the devices 1-32 also takes a mod of the CRC with a baud-rate index count to point to the same location in a lookup table with the same value. In embodiments the lookup table can be locally stored at the host 120 and each of the devices 1-32. At Step 6 (S6), the host 120 switches to the new baud-rate. At step 7 (S7), the devices 1-32 also switch to the new baud-rate. At Steps 8-10 (S8, S9, S10), the host 120 checks for any bus errors (S8); stops the CAN bus system 100A' if errors are detected (S9); and reports any troubles associated with the detected errors (S10).

Figure 7:
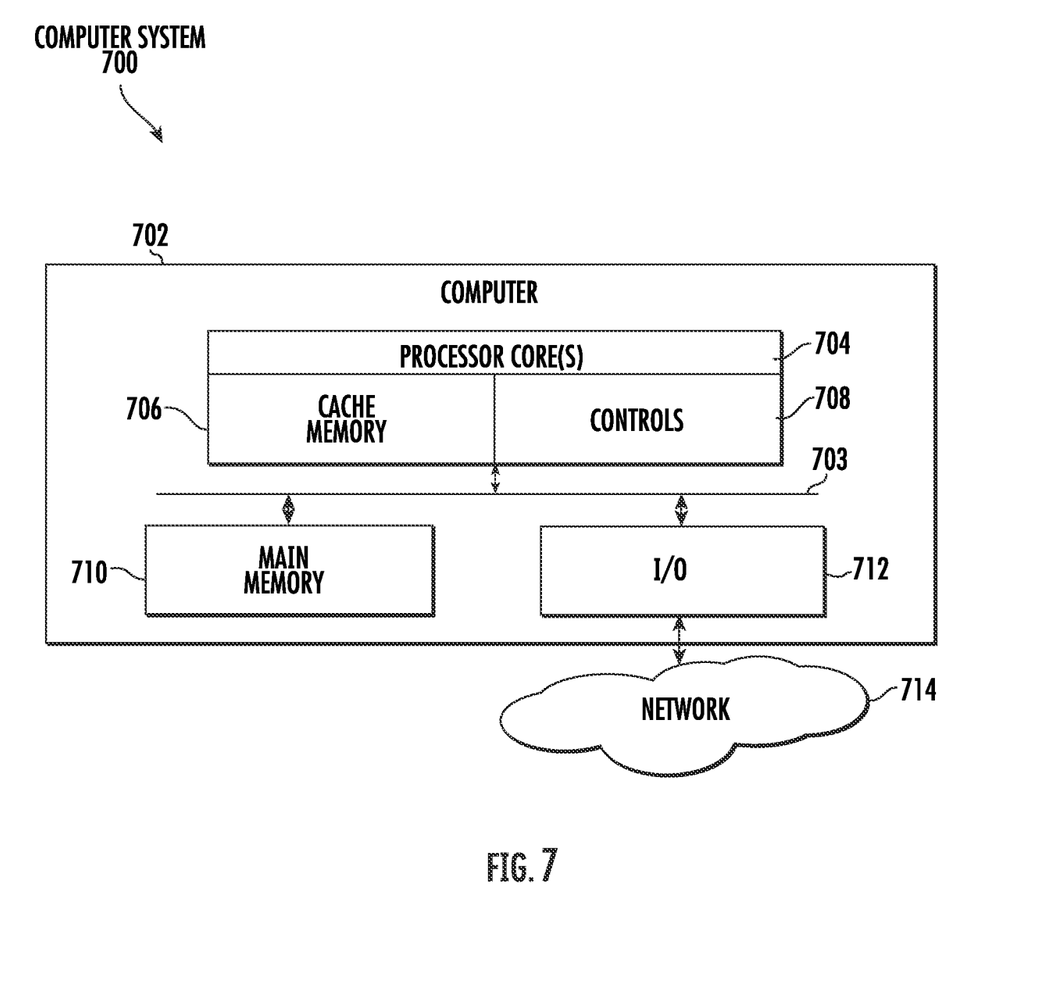
FIG. 7 is a block diagram of a programmable computer system operable to implement aspects of a baud-rate change process according to embodiments of the present disclosure.

FIG. 7 illustrates an example of a computer system 700 that can be used to implement the aspects of the disclosure described herein. The computer system 700 includes an exemplary computing device ("computer") 702 configured for performing various aspects of the content-based semantic monitoring operations described herein in accordance embodiments of the disclosure. In addition to computer 702, exemplary computer system 700 includes network 714, which connects computer 702 to additional systems (not depicted) and can include one or more wide area networks (WANs) and/or local area networks (LANs) such as the Internet, intranet(s), and/or wireless communication network(s). Computer 702 and additional system are in communication via network 714, e.g., to communicate data between them.

Exemplary computer 702 includes processor cores 704, main memory ("memory") 710, and input/output component(s) 712, which are in communication via bus 703. Processor cores 704 includes cache memory ("cache") 706 and controls 708, which include branch prediction structures and associated search, hit, detect and update logic, which will be described in more detail below. Cache 706 can include multiple cache levels (not depicted) that are on or off-chip from processor 704. Memory 710 can include various data stored therein, e.g., instructions, software, routines, etc., which, e.g., can be transferred to/from cache 706 by controls 708 for execution by processor 704. Input/output component(s) 712 can include one or more components that facilitate local and/or remote input/output operations to/from computer 702, such as a display, keyboard, modem, network adapter, etc. (not depicted).

Embodiments of the disclosure described herein can be a system, a method, and/or a computer program product at any possible technical detail level of integration. The computer program product may include a computer readable storage medium (or media) having computer readable program instructions thereon for causing a controller or processor to carry out aspects of the embodiments of the disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

For the sake of brevity, conventional techniques related to making and using the disclosed embodiments may or may not be described in detail herein. In particular, various aspects of computing systems and specific computer programs to implement the various technical features described herein are well known. Accordingly, in the interest of brevity, many conventional implementation details are only mentioned briefly or are omitted entirely without providing the well-known system and/or process details.

Many of the function units of the systems described in this specification have been labeled or described as modules. Embodiments of the disclosure apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together but can include disparate instructions stored in different locations which, when joined logically together, function as the module and achieve the stated purpose for the module.

The various components, modules, sub-function, and the like of the systems illustrated herein are depicted separately for ease of illustration and explanation. In embodiments of the disclosure, the operations performed by the various components, modules, sub-functions, and the like can be distributed differently than shown without departing from the scope of the various embodiments described herein unless it is specifically stated otherwise.

For convenience, some of the technical operations described herein are conveyed using informal expressions. For example, a processor that has data stored in its cache memory can be described as the processor "knowing" the data. Similarly, a user sending a load-data command to a processor can be described as the user "telling" the processor to load data. It is understood that any such informal expressions in this detailed description should be read to cover, and a person skilled in the relevant art would understand such informal expressions to cover, the formal and technical description represented by the informal expression.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A communications network comprising:
a bus electronically coupled to a first device and a second device;
wherein each of the first device and the second device is configured to utilize a currently-used baud rate to place messages on the bus and receive messages from the bus;
wherein the currently-used baud rate is valid for the messages placed on the bus and received from the bus by the first device and the second device for a duration of a currently-used communications time window;
wherein the first device and the second device are configured to perform multiple iterations of a baud-rate change (BRC) process; and
wherein each of the multiple iterations of the BRC process comprises:
synchronizing the first device and the second device to identify a new currently-applied communications time window during which a baud-rate switch operation is applied; and
applying the baud-rate switch operation to change the currently-used baud-rate to a new baud-rate that is valid for the messages placed on the bus and received from the bus by the first device and the second device for a duration of the new currently-applied communications time window.

2. The communications network of claim 1, wherein the first device is configured to detect error messages on the bus generated by a third device electronically coupled to the bus.

3. The communications network of claim 2, wherein the third device is not configured to perform the BRC process.

4. The communications network of claim 3, wherein the first device is configured to, responsive to detecting error messages on the bus generated by the third device, initiate counter-cyber-attack actions.

5. The communications network of claim 4, wherein the counter-cyber-attached actions are selected from the group consisting of:
pausing the bus;
shutting the bus down;
logging a cyber-attack event;
providing a notification of a potential malicious presence on the bus; and
requesting technical assistance.

6. The communications network of claim 1, wherein:
the currently-used communications time window is less than a malicious action time window; and
the malicious action time window defines a minimum time required by a third device electronically coupled to the bus to determine the currently-used baud-rate of communications between the first device and the second device without using the BRC process.

7. The communications network of claim 6, wherein:
the new currently-used communications time window is less than the malicious action time window; and
the malicious action time window further defines a minimum time required by the third device electronically coupled to the bus to determine the new currently-used baud-rate of communications between the first device and the second device without using the BRC process.

8. The communications network of claim 1, wherein:
synchronizing the first device and the second device comprises the first device broadcasting a baud-rate switch time over the bus;
the baud-rate switch operation comprises computing the new baud-rate from a data block transmitted over the bus; and
the data block is also used to perform bit timing operations.

9. The communications network of claim 8, wherein:
the communications network comprises a controller area networking (CAN) network;
the data block comprises:
a SYNC_SEG data segment;
a PROP_SEG data segment;
a PHASE_SEG1 data segment; and
a PHASE_SEG2 data segment; and
the new baud-rate is not one of a set of standard CAN network baud-rates.

10. The communications network of claim 1, wherein:
synchronizing the first device and the second device comprises the first device broadcasting a start message over the bus;
the baud-rate switch operation is responsive to the start message; and
the baud-rate switch operation comprises selecting the new baud-rate from stored baud-rate options.

11. A method of operating a communications network, the method comprising:
using a first device and a second device electronically coupled to one another through a bus to perform multiple iterations of a baud-rate change (BRC) process;

wherein each of the first device and the second device is configured to utilize a currently-used baud rate to place messages on the bus and receive messages from the bus;

wherein the currently-used baud rate is valid for the messages placed on the bus and received from the bus by the first device and the second device for a duration of a currently-used communications time window;

wherein each of the multiple iterations of the BRC process comprises:

synchronizing the first device and the second device to identify a new currently-applied communications time window during which a baud-rate switch operation is applied; and applying the baud-rate switch operation to change the currently-used baud-rate to a new baud-rate that is valid for the messages placed on the bus and received from the bus by the first device and the second device for a duration of the new currently-applied communications time window.

12. The method of claim 11 further comprising using the first device to detect error messages on the bus generated by a third device electronically coupled to the bus.

13. The method of claim 12, wherein the third device is not configured to perform the BRC process.

14. The method of claim 13 further comprising using the first device to, responsive to detecting error messages on the bus generated by the third device, initiate counter-cyber-attack actions.

15. The method of claim 14, wherein the counter-cyber-attached actions are selected from the group consisting of:
pausing the bus;
shutting the bus down;
logging a cyber-attack event;
providing a notification of a potential malicious presence on the bus; and
requesting technical assistance.

16. The method of claim 11, wherein:
the currently-used communications time window is less than a malicious action time window; and
the malicious action time window defines a minimum time required by a third device electronically coupled to the bus to determine the currently-used baud-rate of communications between the first device and the second device without using the BRC process.

17. The method of claim 16, wherein:
the new currently-used communications time window is less than the malicious action time window; and
the malicious action time window further defines a minimum time required by the third device electronically coupled to the bus to determine the new currently-used baud-rate of communications between the first device and the second device without using the BRC process.

18. The method of claim 11, wherein:
synchronizing the first device and the second device comprises the first device broadcasting a baud-rate switch time over the bus:
the baud-rate switch operation comprises computing the new baud-rate from a data block transmitted over the bus; and
the data block is also used to perform bit timing operations.

19. The method of claim 18, wherein:
the communications network comprises a controller area networking (CAN) network;
the data block comprises:
a SYNC_SEG data segment;
a PROP_SEG data segment;
a PHASE_SEG1 data segment; and
a PHASE_SEG2 data segment; and
the new baud-rate is not one of a set of standard CAN network baud-rates.

20. The method of claim 11, wherein:
synchronizing the first device and the second device comprises the first device broadcasting a start message over the bus;
the baud-rate switch operation is responsive to the start message; and
the baud-rate switch operation comprises selecting the new baud-rate stored baud-rate options.

* * * * *